April 2, 1963
E. A. VOLD
3,083,744
DUAL-FOLDING STOP GAGE
Filed June 28, 1960
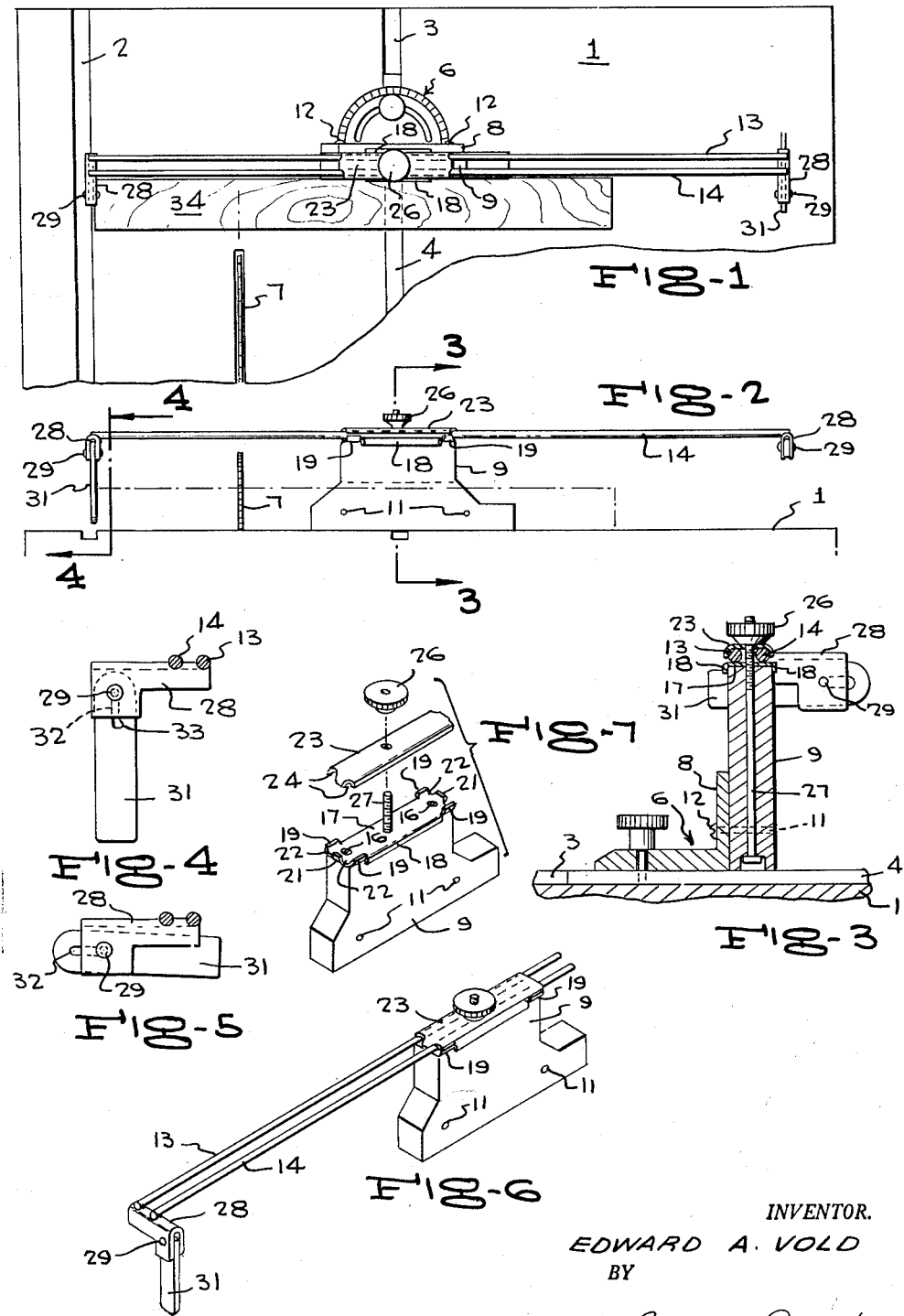
INVENTOR.
EDWARD A. VOLD
BY
McMorrow, Berman & Davidson
ATTORNEYS

3,083,744
DUAL-FOLDING STOP GAGE
Edward A. Vold, R.R. 1, Bonners Ferry, Idaho
Filed June 28, 1960, Ser. No. 39,376
4 Claims. (Cl. 143—169)

This invention relates to a stop gage for achieving exact dimensioning in duplicating identical pieces in machine operations, and more particularly, to a stop gage for "cutting to length" on circular saws or the like. This process is attended with certain difficulties, and various approaches to the problem have been suggested. Conventionally, the miter head for a saw has a longitudinal bore designed to receive a stop rod which is clamped in place at slidably adjustable positions and which has a hooked outer end which serves as the gage stop. This arrangement has several drawbacks, among which is the fact that it cannot be moved out of the way during the sawing operation without losing the fixed setting, and carrying through the saw cut with the stop in place entails possible binding and resultant kickback as well as a possible disturbance of the setting which may go undetected. These devices also require that the operator be on the alert to remove or relocate the rod when the miter head is moved to the other side of the saw, since the rod will not clear the saw blade. In addition, the maximum length possible for the cut-off pieces is somewhat limited.

It is therefore an object of the invention to provide a stop gage which can be repeatedly moved out of operative position without disturbing the length setting. A further object is to provide a gage which will provide an enlarged range of possible board lengths as compared with prior experience. Yet another object is to provide a gage which will clear the saw in any operation, and which, therefore may remain attached to the miter head at all times. Other objects are to provide a gage which eliminates kickback, is simple, inexpensive, and easy of manufacture, installation and manipulation.

These and other ends are attained by the invention, which may be briefly described as a system comprising a main, supporting head or block adapted for attachment to a miter upright, and which carries, at a height above the maximum adjusted position of the top of the saw blade, a pair of slide rods in clamped engagement, carrying at each end a channel-form member pivotally mounting, in jack-knife fashion, a stop blade which may be lowered to function as a stop or swung upwardly and stowed away in inoperative position.

For a more detailed description of the invention, reference is made to the following specification, as illustrated in the drawing, in which:

FIGURE 1 is a top plan view of a portion of a saw table, with the gage mounted in place;

FIGURE 2 is an end elevational view of the assembly, as seen from below FIGURE 1;

FIGURE 3 is a sectional view taken along the line 3—3 of FIGURE 2;

FIGURE 4 is a view along the line 4—4 of FIGURE 2, showing the stop gage in side elevation;

FIGURE 5 is a view similar to FIGURE 4 showing an adjusted position of the stop gage;

FIGURE 6 is a perspective view of the gage assembly, per se, apart from the saw table; and, FIGURE 7 is a perspective view of the gage mounting block, with the parts exploded.

Referring to the drawings by characters of reference, there is shown, in FIGURES 1 to 3, a conventional saw table 1 with guide slots 2, 3 of channel section receiving the guide rod 4 of a miter 6 in the well-known construction, the circular saw blade 7 being located intermediate the guide slots. Secured to the upright 8 of the miter is the mounting block 9 of the gage assembly, in respect to which attention is further directed to FIGURES 4 to 7.

The block 9 has a pair of threaded bores 11 receiving bolts 12 which secure the block to the miter upright. A pair of supporting rods 13, 14, which carry the actual stop gages at opposite ends, is mounted for sliding adjustment atop the gage-mounting block 9 by a two-part saddle, as follows:

Fixed to the top surface of block 9, as by screws 16, is a lower plate 17 with downwardly bent tabs 18 on its long sides, snugly enclosing the top edges of the block 9 and this distributing twisting stresses which would otherwise be concentrated on screws 16. At their four ends, the sides of plate 17 have upturned tabs 19 cooperating with central, upturned tabs 21 on the ends of the plate to define a set of four, semicircular recesses 22 which receive the rods 13 and 14 in parallel relation. The upper plate 23 of the rod clamp has conversely disposed tabs defining semicircular recesses 24 which are received on the upper half of the rods 13, 14. The upper plate is clamped onto the rods by a nut 26 cooperating with a bolt 27 passing through a vertical bore in block 9 and through bores in the clamp plates 17 and 23.

At each of their opposite ends, the pair of rods 13, 14 carry a gage stop holder 28, L-shaped in side profile and of channel section. As shown, these have semi-circular recesses in their upper edges in which the rods are fixed as by welding. However, the rods may also be secured in full circular apertures in these holders. The foot portion of the L-shaped holder carries a pin 29 on which is swingably mounted a blade 31 which constitutes the stop means proper. The pin 29 is received through an elongate slot 32 in the blade, the purpose of which is to permit stowing of the stop blade out of its working position, as seen in FIGURE 5, wherein the blade 31 has been moved on the pin to the extent that the end of the blade contacts the channel bottom in the holder 28, thus preventing its return to downwardly depending position, as in FIGURE 4. In order to guarantee retention of the blade in stowed position against the effects of vibration or minor shocks, the slot 32 is recessed at its inner end, as indicated at 33, which has the effect of inhibiting sliding movement of the blade.

Assuming that short sections of board are desired, the set-up will be as in FIGURE 1, the operator's position being at the top of the figure. The blade 31 at the left of the figure will be down, and the one at the right will be in stowed position for ready feeding of the work-piece 34 in successive movements toward the stop means. For each cut, the board is moved into contact with the stop and the latter is then flipped to stowed position and the cut made.

For longer sections of board, the blade to the right will be down and the one to the left will be up. In each given case the proper length is set by sliding adjustment of rods 13, 14 in their clamp mounting. There is no need to remove the gage assembly since it will clear the saw in any and all operations.

In the case of cross-cutting boards of substantial width the matter of jamming becomes less of a problem, and the stop blade may be left down to serve as a fence or steadying element for the major part of the cut, and flipped up just before completion of the cut.

While a certain, preferred embodiment of the invention has been shown and described, the same is not limited thereby since various changes, modifications or substitutions of analogous elements will occur to those skilled in the art in the light of this disclosure, and no limitation should be inferred except as shall reasonably appear from the spirit and scope of the appended claims.

I claim:
1. A stop gage assembly for use with power tools, comprising a mounting head, a pair of clamp members having complementary recesses slidably receiving a pair of supporting rods in spaced, parallel arrangement, means removably securing said clamp means to the top of said head, a holder of inverted channel section fixed to said pair of rods at an end thereof and transverse to said rods, said holder having downwardly depending wall sections at one end, a pin in said wall sections, and a stop blade having an elongate, longitudinal slot near one end received on said pin, and said slot having a lateral recess at one end.

2. A stop gage assembly for use with power tools, comprising a mounting head, means on the upper side of said head slidably receiving a pair of spaced parallel rods for adjusted positioning, a holder of inverted channel section fixed to said pair of rods at an end thereof and transverse to said rods, a transverse pin carried by said holder near one end thereof, and a stop blade having an elongate, longitudinal slot near one end received on said pin, and said slot having a lateral recess at one end.

3. A stop gage assembly for use with power tools comprising a mounting head, means on said head slidably receiving a pair of spaced, parallel rods for adjustable positioning, a holder of inverted channel section fixed to said pair of rods at an end thereof and transverse to said rods, a stop blade having an elongate bore, slidably and swingably mounted on a pin in said holder, and said elongate bore adapted to hold said blade against swinging movement in one adjusted position of its mounting.

4. A stop gage assembly comprising a mounting head, a cantilever support slidably received on said head, and a stop element of jack-knife form carried by said support, said element having a pivoted blade which depends vertically in working position, and a female member which stores the blade in an adjusted position of swing, said blade having a loose, pivoted mounting for sliding movement in in addition to its swinging movement.

References Cited in the file of this patent
UNITED STATES PATENTS

| | | |
|---|---|---|
| 1,092,518 | Brooks | Apr. 7, 1914 |
| 1,585,535 | Crogan | May 18, 1926 |
| 1,830,580 | Wappat | Nov. 3, 1931 |
| 2,237,556 | Hedgpeth | Apr. 8, 1941 |
| 2,435,382 | Caskey | Feb. 3, 1948 |
| 2,667,190 | Delano | Jan. 26, 1954 |
| 2,787,301 | Anderson | Apr. 2, 1957 |
| 2,884,965 | Stahl | May 5, 1959 |